United States Patent
Huth et al.

(10) Patent No.: US 9,428,108 B2
(45) Date of Patent: Aug. 30, 2016

(54) VEHICLE ENVIRONMENT MONITORING SYSTEM

(71) Applicant: GM GLOBAL TECHNOLOGY OPERATIONS LLC, Detroit, MI (US)

(72) Inventors: Johannes Huth, Trebur (DE); Gerald Schmidt, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/335,610

(22) Filed: Jul. 18, 2014

(65) Prior Publication Data
US 2015/0022331 A1 Jan. 22, 2015

(30) Foreign Application Priority Data

Jul. 18, 2013 (DE) .................. 20 2013 006 467 U

(51) Int. Cl.
*G08G 1/16* (2006.01)
*B60Q 5/00* (2006.01)

(52) U.S. Cl.
CPC .............. *B60Q 5/005* (2013.01); *G08G 1/165* (2013.01)

(58) Field of Classification Search
CPC ........ B60Q 5/005; B60Q 1/525; B60Q 5/00; B60Q 5/006; G60Q 5/006; G08B 1/165; G08B 21/02; G08G 1/123; G08G 1/166; G08G 1/16; G08G 1/161; G06K 9/00805; G06K 9/00201; B60R 21/0134; G01S 3/7865; B60B 1/165; G08C 21/00

USPC .............. 340/425.5, 435, 436, 903; 348/148, 348/149; 701/45, 9, 300–301; 382/103–104
See application file for complete search history.

(56) References Cited

U.S. PATENT DOCUMENTS

| 7,782,184 | B2 * | 8/2010 | Wittorf et al. | 340/468 |
| 2005/0131646 | A1 * | 6/2005 | Camus | B60R 21/013 |
| | | | | 701/301 |
| 2006/0164219 | A1 * | 7/2006 | Knoll | 340/435 |
| 2012/0089321 | A1 * | 4/2012 | Jung | 701/301 |
| 2013/0223686 | A1 * | 8/2013 | Shimizu et al. | 382/103 |
| 2014/0074359 | A1 * | 3/2014 | Lane | 701/45 |

FOREIGN PATENT DOCUMENTS

| DE | 10359192 | A1 | 7/2005 | |
| DE | 102004016981 | A1 | 10/2005 | |
| DE | 102005041535 | * | 3/2007 | 340/435 |
| DE | 102007045932 | A1 | 4/2009 | |
| DE | 102010043722 | A1 | 5/2012 | |
| DE | 102011117297 | A1 | 5/2013 | |
| GB | 2443664 | * | 10/2006 | 340/435 |

* cited by examiner

*Primary Examiner* — Hung T Nguyen
(74) *Attorney, Agent, or Firm* — Lorenz & Kopf, LLP

(57) ABSTRACT

A vehicle environment monitoring system is disclosed which includes a people detection unit for detecting the presence of people in the environment of a vehicle and a danger signaler for generating danger signals of at least one first kind. A decision unit for deciding on the generation of a danger signal of the first kind when detecting a person by means of the people detection unit in dependence of the visibility of the person for the driver of the vehicle.

14 Claims, 1 Drawing Sheet

VEHICLE ENVIRONMENT MONITORING SYSTEM

CROSS REFERENCE TO RELATED APPLICATION

This application claims priority to DE Patent Application No. 202013006467.6 filed Jul. 18, 2013, which is incorporated herein by reference in its entirety.

TECHNICAL FIELD

The technical field relates to a vehicle environment monitoring system with a people detection unit for detecting the presence of people in the environment of a vehicle and with a signaler interacting with the detection unit.

BACKGROUND

The DE 10 2009 027 911 A1 describes a vehicle environment monitoring system of this kind, where the signaler generates an audio signal to be perceived outside the vehicle. This conventional monitoring system is proposed for use in electric or hybrid vehicles in order to ensure with the aid of an audio signal that the vehicle cannot approach a pedestrian unnoticed although the noises it makes while being electrically driven are very quiet noises.

Automatic detection of people in the environment of the vehicle is not only useful for warning affected people of a low-noise vehicle approaching but it can also be used, independently of whether the vehicle is an electrically driven vehicle or a vehicle driven by a combustion engine, for drawing the driver's attention to people external to the vehicle which he might have overlooked.

In the vast majority of cases an attentive driver will be automatically aware of people present in the vicinity of the vehicle which might cross its path, whilst a monitoring system generating clues as to the presence of all these people, is a hindrance in that it contributes to sensory overload for the driver rather than increasing safety.

It is therefore the requirement of an embodiment of the present disclosure to propose a vehicle environment monitoring system that can warn the driver of the presence of people in the environment of the vehicle without creating sensory overload.

The requirement is met in that a vehicle environment monitoring system with a people detection unit for detecting the presence of people in the vicinity of the vehicle and with a danger signaler for generating danger signals at least of a first kind, includes a decision unit for deciding on the generation of a danger signal of a first kind when detecting a person by means of the people detection unit in dependence of the visibility of the person for a driver of the vehicle.

By not generating a signal for well visible people the number of signals can be considerably reduced, thereby diminishing the danger of merely irritating the driver through the generation of superfluous signals.

The people detection unit may be adapted, when detecting the presence of people, to distinguish between people in a core warning region and a peripheral warning region surrounding the core warning region, and the danger signaler may be adapted to emit a danger signal of the first kind when a person is present in the peripheral warning region and a danger signal of the second kind when a person is present in the core warning region. In this way it is possible to differentiate between different danger levels originating from people in different warning regions. In particular the core warning region can essentially correspond to the driving path, i.e. the space through which the vehicle will move in extrapolation of its previous course and in which a collision is therefore to be expected if the vehicle maintains this course. The peripheral warning region however can extend on either side of the driving path so that a collision with a person present in it is to be expected only if the person advances into the driving path.

Detection of a person within the core warning region should be sufficient reason for emitting the danger signal of the second kind, whilst detection of a person within the peripheral warning region is merely a necessary reason and a decision is made based on the visibility of the person as to whether a danger signal of the first kind should actually be generated, as described above. The danger signal of the second kind should include an acoustic signal in order to be perceived by the driver independently of his viewing direction.

The danger signal of the first kind is preferably only an optical signal in order to avoid sensory overload for the driver through acoustic signals and in order to avoid that he gets hardened, possibly, against such signals as a result. In order to assess the visibility of a person in the vicinity of the vehicle for the driver the decision unit may be connected with means for detecting the viewing direction of the driver. Means of this kind such as for example a camera directed at the eyes of the driver are known as components of systems for detecting driver fatigue and can, in terms of the monitoring system according to the present disclosure, be adapted at small expense to fulfill this need. If the detected viewing direction of the driver does not coincide with the direction in which the person has been detected, then the person is presumably not visible to the driver and the danger signal should be emitted.

The decision unit can further be connected with a brightness sensor for assessing the visibility of a detected person, in order to take account of the fact that the visibility of people depends upon the brightness of the environment. Rain may also have an influence on how the driver perceives the vehicle environment. Therefore the decision unit for assessing the visibility of the detected person is conveniently also connected with a rain sensor.

It is also advantageous if the decision unit is connected with a tachometer, since at high speed there is little time available to the driver in which to detect a person, and therefore the probability for a person to be overlooked is correspondingly greater. The decision unit may further be adapted to assess the visibility of a detected person in dependence of the type of road on which the vehicle is travelling. Such a detection may be based on a detection of steering maneuvers of the driver and may e.g. take account of the fact that low speed and frequent operation of the brakes points to the fact that the vehicle is travelling in a built-up area, whilst a constant movement in a straight line at high speed and small steering angles indicates a motorway. In the former case it is to be expected that people are frequently present in the vicinity of the vehicle and that it is possible for the driver to overlook one or two of them, whilst in the latter case there are normally no people in the vicinity of the vehicle but if this should be the case that the driver would notice them. The information, on which the assessment of the type of road driven over is based, can of course also be provided by a navigation system.

The people detection unit should further be adapted to estimate the distance of a detected person from the vehicle. As such, when deciding on the generation of a danger signal, note should be taken of the fact that a person far away from the driver is more likely to be overlooked than a person in the immediate vicinity of the vehicle. The people detection unit may include a camera, in particular an infrared camera. With such a people detection unit it is also convenient to assess the visibility of a detected person in dependence of the amount of detail in an image supplied by the camera, because in a vehicle environment which is rich in detail the probability of the driver overlooking a person is greater than in an environment with less detail.

The requirement set forth above is further met by a method for monitoring the environment of a vehicle including the steps of: (a) detecting the presence or absence of people in the vicinity of a vehicle; (b) assessing the visibility of the person for a driver of the vehicle when the presence of at least one person is detected; and (c) generating a danger signal if the visibility of the person drops below a limit value.

A subject of the present disclosure is also a computer program product which includes instructions which when being executed on a computer enable the same to function as a decision unit and/or a people detection unit of a vehicle environment monitoring system as described above or to execute the method described above. A further subject of the present disclosure is a computer-readable data carrier on which program instructions are recorded which enable a computer to operate in the above-described manner.

Further features and advantages of the present disclosure are revealed in the description below of exemplary embodiments with reference to the attached figures. This description and the attached figures also reveal features of the exemplary embodiments not mentioned in the claims. Such features may of course occur also in other than the specifically disclosed combinations. The fact that several such features are all mentioned in the same sentence or in another kind of textual context, therefore does not justify the conclusion that they may occur only in the specifically disclosed combination.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
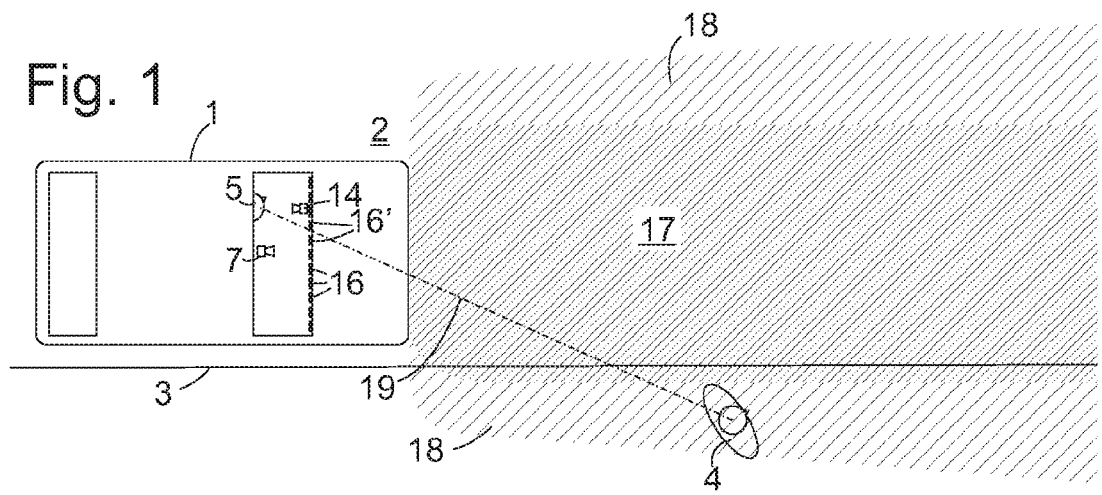
FIG. 1 shows a typical application situation of the vehicle environment monitoring system.

FIG. 1 shows a schematic top view of a motor vehicle 1, which is equipped with a vehicle environment monitoring system according to the present disclosure and is travelling on a road 2. Beyond the edge 3 of the road there is a person 4. As long as the person 4 maintains his/her location or moves in parallel to the edge 3 of the road there is no danger of a collision with the vehicle 1 because the vehicle only moves on the road 2. In this case a driver 5 could steer the vehicle 1 in a straight line past the person 4, but he should be in a position to swerve if the person 4 unexpectedly moves in direction of the carriageway. To this end it must be ensured that the driver 5 has seen the person 4. In order to help him do so the vehicle 1 is equipped with a vehicle environment monitoring system.

Figure 2:
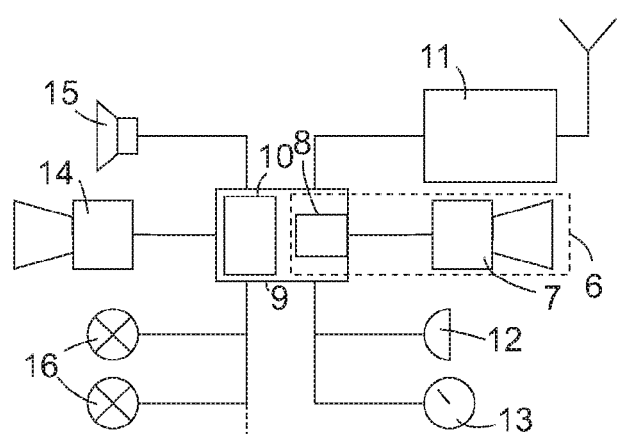
FIG. 2 shows a block diagram of the monitoring system.

A people detection unit 6 includes a camera 7 directed onto the road 2 in front of the vehicle 1, in particular an infrared camera and an image evaluation unit 8, typically a microprocessor system which is combined with the camera 7 to form a constructional unit or, as shown in FIG. 2, may be part of a central processor unit 9. The image evaluation unit 8 informs a decision unit 10 of people detected in the images of the camera 7 and of their positions relative to the vehicle, which decision unit 10, in the view of FIG. 2, utilizes like the image evaluation unit 8 part of the processing capacity of the processor unit 9.

In order to assess the visibility of a person detected by the image evaluation unit 8 the decision unit 10 is connected with various sensors or information sources. In the view of FIG. 2 these include a navigation system 11, a rain sensor 12, a tachometer 13. The camera 7 already mentioned may serve as a brightness sensor. A second camera 14 is mounted inside the vehicle and aligned with the driver 5 in order to detect his viewing direction. In other arrangements of the monitoring system further information sources may be provided, or one or more of the above mentioned information sources may be absent.

In order to issue clues to the driver 5 concerning the detected person, the decision unit 10 is connected with an acoustic danger signaler 15 such as a loudspeaker as well as with an optical danger signaler 16, here in the form of a number of light sources provided on the dashboard of the vehicle at the lower edge of its front windscreen as a kind of head-up display.

Figure 3:
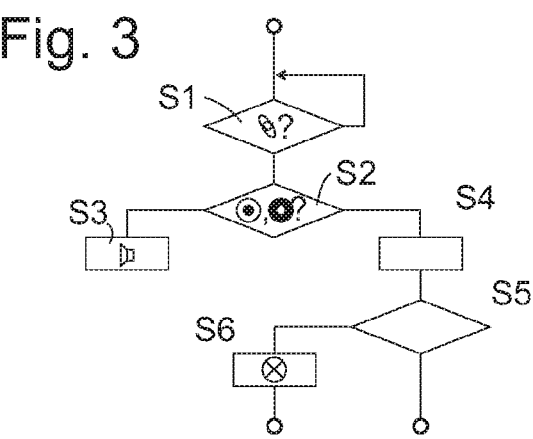
FIG. 3 shows a flow diagram of an operating method of the monitoring system.

FIG. 3 illustrates the operation of the decision unit 10. In step S1 the decision unit 10 is waiting as to whether the people detection unit 6 supplies clues as to the presence of a person in the vicinity of the vehicle. The environment monitored by the camera 7, as shown in FIG. 1, divides into a core warning region 17 and a peripheral warning region 18 to the right and the left thereof as viewed by the driver 5. The core warning region 17 essentially coincides with the driving path of the vehicle 1, i.e. it extends forward in a straight line in driving direction as an elongation of the lateral flanks of the vehicle 1. It is also feasible, taking into consideration the momentary steering angle of the vehicle 1 and the resulting curve of its trajectory, to assume a curved core warning region 17 which emulates the expected course of the vehicle 1. It is also possible for the image evaluation unit 8 to identify the images of the road 2 in the pictures respectively supplied by the camera 7 and to determine these to constitute the core warning region 17.

The peripheral warning region 18 typically encompasses the edge 3 of the road, i.e. in particular pedestrian walkways on which people are likely to be present. When the image evaluation unit 8 signals the detection of a person in the vicinity of the vehicle 1, an association is made in step S2 as to whether the respective person is present in the core warning region 17 or in the peripheral warning region 1. In case there is a person in the core warning region 17 there is the immediate danger of a collision, and an acoustic warning signal is emitted (S3) to the driver 5 via the signaler 15 in order to cause him to brake or change driving direction.

If the detected person is in the peripheral warning region 18 there is no immediate danger, and the generation of a danger signal is possibly superfluous because the driver has already seen the respective person and is taking this into account by an appropriate steering maneuver. A decision as to whether the driver should be alerted to the presence of a person is taken in steps S4 and S5. This decision may take into consideration a plurality of diverse factors and information sources. In case the monitoring system of the vehicle 1 includes the above-mentioned camera 5, part of the decision-making of step S4 may consist in determining the viewing direction of the driver 5 with reference to the image supplied by the camera 14, and in assuming, if the driver, as shown in FIG. 1, does not look in direction of the person 4 but in a different direction, that he has not seen the person, and in emitting a danger signal to the person 4 (S6). If there is no camera 14, or if the viewing direction of the driver does not give cause to assume that he has not seen the person 4, other criteria can be employed.

These criteria can be taken account of in that a detected person is allotted a point score which is then weighted with various factors in order to obtain a quantitative measure for the visibility of the respective person for the driver 5. A point score can be specified as fixed or it may be a function of the distance of the person from the vehicle, in order to account for the fact that people further away are less visible. For simplicity's sake it is assumed in the description below that an increasing point score stands for bad visibility; the opposite is of course also possible.

The size of the image of the person may be set in relation to his/her distance. A small image of the person for a given distance may point to the fact that the person is a child or the person is partially hidden. Both justify an increased point score in case of bad visibility, be it by adding it to a fixed value or by multiplying it with a weighting factor.

The brightness of the monitored environment may be determined from the image of the camera 7 or may be supplied by an independent brightness sensor. The weighting factor derived therefrom decreases with increasing brightness of the environment. If the brightness limit value is exceeded, such as in broad daylight, the weighting factor may be zero.

To detect a person in an environment with many details is more difficult for the driver 5 than in one with less detail. In order to estimate the amount of detail a spatial frequency transformation of the image supplied by the camera 7 may be utilized which may have already been generated in terms of the person's detection by the image evaluation unit 8. The higher the percentage of high frequencies in this spatial frequency transformation, the more detail there is in the image, thus resulting in a correspondingly higher weighting factor.

A further possible weighting factor is proportional to a measured speed value supplied by the tachometer 13, in order to account for the fact that the time available to the driver for detecting a person becomes ever shorter as the speed of the vehicle 1 increases.

Yet another weighting factor may be derived from the rain sensor 12, in order to account for impaired visibility due to rain. The rain sensor can supply a direct signal representative of the precipitation on the bodywork of the vehicle, but an indirect sensor is also useful in that it merely records the reaction of the driver 5 to rain by polling the position of a windscreen wiper switch.

Similarly fog can be taken into account. The camera 7 could be utilized as a sensor for fog, a high percentage of unsaturated color shades and weak contrasts in the images supplied by the camera 7 could point to fog being present and justify a high weighting factor; or the position of a fog light switch may be used as a safe conclusion of the fact that fog is present.

A further weighting criterion may be the kind of road 2 on which the vehicle travels. This can be derived from the steering behavior of the driver, or even better from data supplied by the navigation system 11. Whilst a normal weighting factor for roads within built-up areas may be e.g. 1, a lower value may be adequate in the vicinity of schools or playschools, which in particular are detectable using data from the navigation system 11. On motorways the weighting factor may be 0 (which in reality corresponds to a deactivation of the vehicle environment monitoring system). An unusually low speed of the vehicle 1 may point to the fact that the vehicle 1 is in a traffic jam, in this case it may be convenient to operate the vehicle environment monitoring system even on the motorway.

The point score calculated in step S4 for the detected person taking into account the various weighting factors is compared with a limit value in step S5. If the limit value is not reached it may be assumed that the respective person is sufficiently visible to the driver 5 and the driver does not need reminding. If the limit value is exceeded, a signal is emitted in step S6.

Independently of how the point value has been calculated in individual cases, the calculation of the quantitative variable representative for the visibility of a person offers the advantage that the driver 5 is offered the advantage of adjusting the limit value as he/she thinks fit, thus adapting the frequency of signals received by him/her according to his/her personal taste. The clue emitted in step S6 may be acoustic like the warning signal of step S3; preference is however for a purely optical signal, e.g. by a flashing of the optical signalers 16.

Since the image evaluation unit 8 is in a position to determine not only the distance but also the position of the person 4 in an image of the camera 7, it is also in a position to calculate the angle at which the person 4 ought to be visible from the perspective of the driver 5. In order to output a signal to the driver, the decision unit 10, according to a further development of the present disclosure, can be adapted to select, from the optical danger signalers 16, those one or more danger signalers 16' which are closest to an imaginary line 19 between the driver 5 and the person 4, in order to cause these signalers 16' to selectively light up. The driver 5 thus receives not only a clue as to the presence of the person 4 but also where this person is positioned, a fact which makes it considerably easier for him/her to detect the person 4 and account for his/her possible movements.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A system for detecting a presence of people in an environment of a vehicle, the system comprising:
   a people detection unit configured to:

detect a visibility for a detected person in the environment of the vehicle and assign a visibility point score thereto;

detect an image size for the detected person;

determine a quantitative measure of the visibility of the person based on at least a weighted visibility point score and the image size of the detected person in relation to a distance from the vehicle;

a danger signaler configured to generate danger signals of at least one first kind; and a decision unit configured to determine when a first kind of danger signal is generated by the danger signaler in response to the people detection unit detecting the detected person as a function of the visibility of the detected person from vehicle, wherein the people detection unit is configured to distinguish between the detected person in a core warning region and the detected person in a peripheral warning region surrounding the core warning region, and wherein the danger signaler is configured to output a danger signal of the first kind when the detected person is present in the peripheral warning region and to output a danger signal of the second kind when a person is present in the core warning region.

2. The system according to claim 1, wherein the detection of the detected person in the core warning region by the detection unit activates the danger signaler to output the second kind of danger signal.

3. The system according to claim 1, wherein the danger signal of the first kind comprises an optical signal, and the danger signal of the second kind comprises an acoustic signal.

4. The system according to claim 1 wherein the decision unit is operably coupled to a detector configured to detect the viewing direction of a driver.

5. system according to claim 1 further comprising a brightness sensor configured to sense a brightness condition, wherein the brightness sensor is operably coupled to the decision unit configured to assess the visibility of the detected person at least as a function of the brightness condition.

6. The system according to claim 1 further comprising a rain sensor configured to sense a rain condition, wherein the rain sensor is operably coupled to the decision unit configured to assess for assessing the visibility of the detected person at least as a function of the precipitation condition.

7. The system according to claim 1 further comprising a fog sensor configured to sense a fog condition, wherein the fog sensor is operably coupled to the decision unit configured to assess the visibility of the detected person at least as a function of the fog condition.

8. The system according to claim 1 further comprising a tachometer configured to sense an engine speed of the vehicle, wherein the tachometer is operably coupled to the decision unit and configured to assess the visibility of the detected person at least as a function of the engine speed.

9. The system according to claim 1 wherein the decision unit is configured to assess the visibility of the detected person in dependence of the road type on which the vehicle is travelling.

10. The system according to claim 1 wherein the people detection unit is configured to estimate a distance between the detected person and the vehicle.

11. The system according to claim 1 wherein the people detection unit comprises a camera.

12. The according to claim 11 wherein the decision unit is configured to assess the visibility of the detected person as a function of a detail level in an image captured by the camera.

13. A computer program product comprising instructions which, when executed on a computer, enable the computer to function as at least one of the decision unit and the people detection unit of the system according to claim 1.

14. A non-transitory computer-readable medium storing a set of program instruction configured to enable a computer to function as at least a decision unit and a people detection unit of the system according to claim 1.

* * * * *